US007596435B1

(12) United States Patent
Tripathi et al.

(10) Patent No.: US 7,596,435 B1
(45) Date of Patent: Sep. 29, 2009

(54) VEHICLE COMMUNICATION SYSTEM AND METHOD WITH MOBILE DATA COLLECTION

(75) Inventors: Pradeep R. Tripathi, Miami Beach, FL (US); Bruce R. Kohn, Tucson, AZ (US)

(73) Assignee: SysTech International, LLC, Murray, UT (US)

( * ) Notice: Subject to any disclaimer, the term of this patent is extended or adjusted under 35 U.S.C. 154(b) by 378 days.

(21) Appl. No.: 11/462,118

(22) Filed: Aug. 3, 2006

Related U.S. Application Data

(60) Provisional application No. 60/704,983, filed on Aug. 3, 2005.

(51) Int. Cl.
*G01M 17/00* (2006.01)

(52) U.S. Cl. .......................................... 701/29; 701/30

(58) Field of Classification Search .................. 701/29, 701/30; 340/425.5
See application file for complete search history.

(56) References Cited

U.S. PATENT DOCUMENTS

| | | | | |
|---|---|---|---|---|
| 4,494,114 | A | 1/1985 | Kaish | 340/5.31 |
| 4,602,127 | A | 7/1986 | Neely et al. | 179/2 A |
| 4,728,922 | A | 3/1988 | Christen et al. | |
| 5,414,626 | A | 5/1995 | Boorse et al. | |
| 5,582,286 | A | 12/1996 | Kalm et al. | |
| 5,726,450 | A | 3/1998 | Peterson et al. | 250/338.5 |
| 5,870,018 | A | 2/1999 | Person et al. | 340/5.65 |
| 5,884,202 | A | 3/1999 | Arjomand et al. | 701/29 |
| 5,916,287 | A | 6/1999 | Arjomand et al. | 701/29 |
| 6,055,468 | A | 4/2000 | Kaman et al. | 701/29 |
| 6,094,609 | A | 7/2000 | Arjomand | 701/29 |
| 6,240,335 | B1 | 5/2001 | Wehrung et al. | |
| 6,253,906 | B1 | 7/2001 | Hall | |
| 6,408,232 | B1 | 6/2002 | Cannon et al. | 701/29 |
| 6,594,579 | B1 | 7/2003 | Lowrey et al. | 701/123 |
| 6,604,033 | B1 | 8/2003 | Banet et al. | 701/33 |

(Continued)

FOREIGN PATENT DOCUMENTS

WO WO 01/84380 A1 11/2001

(Continued)

OTHER PUBLICATIONS

European Search Report from commonly assigned European Patent Application No. 02796140.8-2215 dated Feb. 28, 2003.

(Continued)

*Primary Examiner*—Mark Hellner
(74) *Attorney, Agent, or Firm*—Van Dyke, Gardner, Linn & Burkhart, LLP

(57) ABSTRACT

A vehicle communication system and method of communicating data from a vehicle, such as for inspecting or diagnosing a vehicle, includes providing a plurality of vehicle units each including a vehicle wireless communication transceiver and a memory. Data, such as vehicle data from a vehicle diagnostic system, is stored in the memory. A communication system is provided for two-way wireless communication with the vehicle units. The communication system is made up of one or more mobile wireless communication transceivers. Vehicle data is communicated from the memory to one of the mobile wireless communication transceivers that is in the vicinity of that vehicle unit. The transporting of the mobile wireless communication transceiver increases interaction between the communication system and the vehicle units.

22 Claims, 3 Drawing Sheets

U.S. PATENT DOCUMENTS

| | | | | |
|---|---|---|---|---|
| 6,636,790 | B1 | 10/2003 | Lightner et al. | 701/33 |
| 6,678,591 | B2 * | 1/2004 | Ohmura et al. | 701/29 |
| 6,729,463 | B2 | 5/2004 | Pfeiffer | |
| 6,732,032 | B1 | 5/2004 | Banet et al. | 701/33 |
| 6,735,503 | B2 | 5/2004 | Ames | 701/29 |
| 6,775,602 | B2 | 8/2004 | Gordon et al. | 701/33 |
| 6,836,708 | B2 | 12/2004 | Tripathi | |
| 6,959,804 | B2 | 11/2005 | Helgerson et al. | |
| 7,374,003 | B1 * | 5/2008 | Fernandez | 180/65.8 |
| 2001/0002451 | A1 | 5/2001 | Breed | |
| 2002/0059075 | A1 | 5/2002 | Schick et al. | 705/1 |
| 2003/0130774 | A1 | 7/2003 | Tripathi et al. | 701/33 |
| 2004/0192348 | A1 * | 9/2004 | Gudmundsson et al. | 455/456.1 |
| 2005/0065711 | A1 * | 3/2005 | Dahlgren et al. | 701/117 |
| 2005/0137757 | A1 * | 6/2005 | Phelan et al. | 701/1 |
| 2006/0211446 | A1 * | 9/2006 | Wittmann et al. | 455/552.1 |
| 2006/0271246 | A1 * | 11/2006 | Bell et al. | 701/1 |

FOREIGN PATENT DOCUMENTS

WO WO 01/86576 A1 11/2001

OTHER PUBLICATIONS

International Search Report (Form PCT/ISA/210) from commonly assigned Patent Cooperation Treaty Application No. PCT/US02/41838, dated Mar. 31, 2003.

Article entitled "Have You Heard About OBD III?," AutoInc. Magazine, vol. XLIV, No. 5, dated May 1996.

Response filed on Oct. 1, 2008, responding to the Office Action mailed on May 12, 2008, for U.S. Appl. No. 11/890,662, which is a continuation-of the patent application published as U.S. Patent Application Publication No. 2003/0130774 A1 issued to Tripathi et al.

Office Action mailed Jan. 8, 2009, for U.S. Appl. No. 11/890,662, which is a continuation-of the patent application published as U.S. Patent Application Publication No. 2003/0130774 A1 issued to Tripathi et al.

* cited by examiner

VEHICLE COMMUNICATION SYSTEM AND METHOD WITH MOBILE DATA COLLECTION

CROSS-REFERENCE TO RELATED APPLICATION

This application claims priority from U.S. provisional patent application Ser. No. 60/704,983, filed on Aug. 3, 2005, the disclosure of which is hereby incorporated herein by reference in its entirety.

BACKGROUND OF THE INVENTION

The present invention is directed to a system and method for communicating data from a vehicle and, in particular, to a system which communicates vehicle data from an onboard vehicle diagnostic system. The invention may be used for vehicle diagnosis, vehicle performance monitoring and/or environmental regulatory compliance.

U.S. Pat. No. 6,636,790 B1 issued to Lightner et al. is directed to a METHOD AND APPARATUS FOR REMOTELY CHARACTERIZING A VEHICLE'S PERFORMANCE. Data representative of the vehicle's performance is generated within the vehicle and transferred through an OBD, OBD-2 or equivalent electrical connector to a data collector or a router including an electrically connected wireless transmitter. A data packet representing the data is transmitted with the wireless transmitter over an air link to a wireless communication system and then to a host computer. The air link is made up of a conventional wireless telephone or paging system.

U.S. Patent Application Publication US 2003/0130774 A1 issued to Tripathi et al. discloses a vehicle unit including a vehicle wireless communication transceiver for controlling the wireless communication transceiver. The control includes memory for storing vehicle data including exhaust emission parameters from a vehicle diagnostic system. A communication network is provided for two-way wireless communication with the vehicle unit. The communication network is made up of a plurality of geographically dispersed wireless communication transceivers. When the vehicle approaches one of the geographically dispersed wireless communication transceivers, that geographically dispersed wireless communication transceiver activates the vehicle wireless communication transceiver to communicate vehicle data in the memory to that geographically dispersed wireless communication transceiver. Thus, as vehicles pass a geographically dispersed wireless communication transceiver, the data is transferred. This is particularly useful for environmental regulatory compliance verification.

SUMMARY OF THE INVENTION

The present invention provides a system and method of communicating data from a vehicle that provides enhanced geographic coverage for transferring the data. This may be accomplished at a significant reduction in cost, thereby facilitating operation of the systems even in sparsely populated areas. Moreover, interactions between the vehicle wireless communication transceiver and the communication system are more likely to occur, thereby enhancing the utility of the system. The invention may also provide convenience to the vehicle owner and be easy to set up.

A vehicle inspection system and method of inspecting a vehicle, according to an aspect of the invention, includes providing a plurality of vehicle units, each including a vehicle wireless communication transceiver and a memory. Data, such as from an onboard vehicle diagnostic system, is stored in the memory. A communication system is provided for two-way wireless communication with the vehicle units. The communication system is made up of at least one wireless communication transceiver. Data is communicated from the memory to the at least one mobile wireless communication transceiver when the mobile wireless communication transceiver is in the vicinity of that vehicle unit.

The transporting of the mobile wireless communication transceiver increases interaction between the communication system and the vehicle unit. The mobile wireless communication transceiver may be positioned in another vehicle, such as another car, a delivery van, a truck, a bus, a train, an aircraft, or the like. The other vehicle may be a commercial vehicle, a public vehicle or a private vehicle that makes frequent trips within a geographic area. The vehicle unit may include an adapter that is configured to connect with a vehicle diagnostic port of a vehicle diagnostic system. The communication system may be made up of a communication network, wherein the communication network includes a host computer and at least one relay unit. The relay unit transfers vehicle data from the mobile wireless communication transceiver to the host computer. The communication system may further include one or more generally stationary wireless communication transceivers that are located adjacent to a roadway traveled by vehicles. This is particularly useful in heavily traveled areas.

The communication system may include a communication network and a host computer on the network. The host computer operates to receive data from the geographically dispersed wireless communication transceivers and includes a database for storing vehicle data from the vehicle unit. Regulatory authority may be provided access to the vehicle data for vehicle environmental regulatory compliance verification. The vehicle owner may be provided access to the vehicle data for vehicle performance monitoring, vehicle diagnostics, or the like.

The vehicle unit may include a control for controlling the wireless communication transceiver. The control may store vehicle data from a vehicle diagnostic system in the memory in response to occurrence of a particular event, such as generation of a diagnostic code, vehicle throttle position, vehicle speed, or the like. The communication system may track the geographic location of the mobile geographically dispersed wireless communication transceiver. This information may be provided to vehicles equipped with a vehicle unit. This may allow the vehicle owner to seek out a mobile geographically dispersed wireless communication transceiver in order to transfer data to the communication system, such as for vehicle environmental regulatory compliance verification. Also, a feedback mechanism may be provided based upon the vehicles from which vehicle data was collected. This may allow the route of the mobile wireless communication transceiver to be controlled to increase contact with vehicles that have not yet transferred data.

These and other objects, advantages and features of this invention will become apparent upon review of the following specification in conjunction with the drawings.

DESCRIPTION OF THE PREFERRED EMBODIMENT

Figure 1:
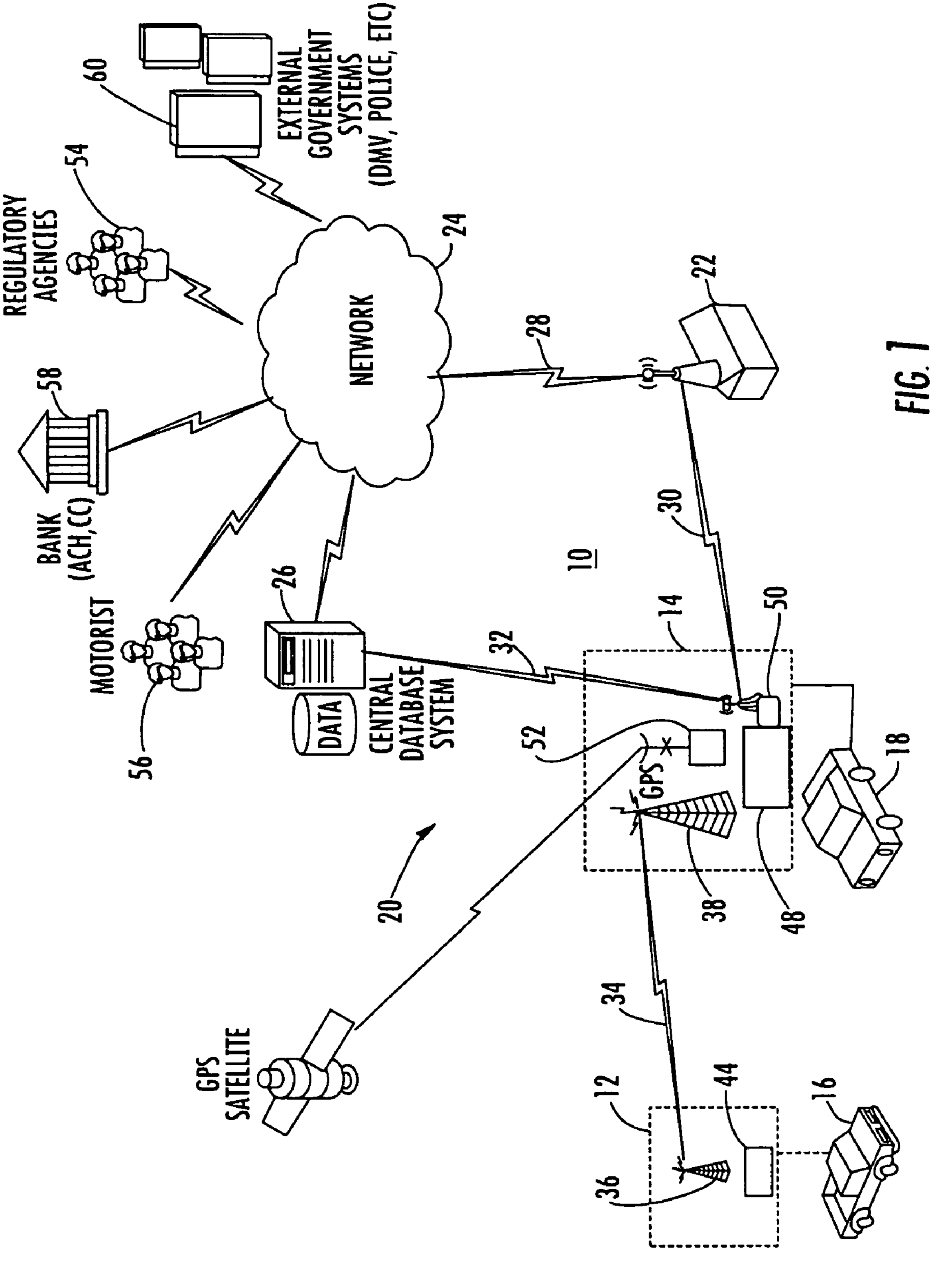
FIG. 1 is a block diagram of a vehicle inspection system and method of inspecting the vehicle, according to the invention.

Referring now specifically to the drawings, and the illustrative embodiments depicted therein, a vehicle inspection system and method 10 includes a plurality of vehicle units 12 (only one of which is shown) and at least one mobile wireless communication transceiver, or mobile data collection unit, 14 (FIG. 1). Vehicle unit 12 is adapted to be connected with a vehicle 16 (which does not form any part of the invention) and, in particular, is adapted to connect with an onboard vehicle diagnostic system. Vehicle unit 12 may connect with a vehicle diagnostic port of a vehicle diagnostic system although the invention may be used with other vehicle electronic systems. Examples of such vehicle diagnostic systems include an OBD that is conventional on recently produced vehicles.

Mobile wireless communication transceiver 14 is mobile and is transported by a transport mechanism 18. Transport mechanism 18 may be another automobile, a truck, a bus, a train, an aircraft, or the like. The transport vehicle may be a commercial vehicle, such as a package delivery truck. It may also be a public vehicle, such as a mail delivery van. The transport vehicle may also be a private vehicle, such as a personal automobile that is outfitted to transport mobile data collection unit 14. Mobile wireless communication transceiver 14 is part of a communication system 20 that provides two-way communication with vehicle unit 12. Communication system 20 may include additional mobile wireless communication transceivers 14. It may additionally include a plurality of generally stationary geographically dispersed communication transceivers (not shown) that are located adjacent to roadways traveled by vehicles, as disclosed in commonly assigned U.S. Patent Application Publication 2003/013074 A1 entitled VEHICLE INSPECTION ENFORCEMENT SYSTEM AND METHOD OFFERING MULTIPLE DATA TRANSMISSIONS ON THE ROAD, published by Tripathi et al., the disclosure of which is hereby incorporated herein by reference. Communication system 20 may additionally include one or more relay units 22, a network 24 and a database system 26. Network 24 may be a private, or public, wide area network, such as an Internet or Intranet. Relay unit 22 may be a fixed or mobile unit that provides an Internet connection 28 with network 24 and a wireless link 30 with mobile wireless transceiver 14. Wireless link 30 may be a wireless fidelity (WiFi) network link or other Bluetooth alternative. Instead of connecting through relay unit 22 with network 24, mobile wireless communication transceiver 14 may communicate directly with central database system 26 with a wireless link 32. Wireless link 32 may be a WiFi network connection, Bluetooth alternative, or the like.

A two-way wireless communication link 34 is provided between vehicle 12 and mobile wireless communication transceiver 14 when vehicle 12 is in the vicinity of mobile wireless communication transceiver 14. Wireless communication link 34 is between a radio frequency wireless communication transceiver antenna 36 in vehicle unit 12 and wireless communication transceiver antenna 38 in mobile unit 14. In the illustrative embodiment, transceiver 38 in the mobile unit activates wireless transceiver 36 of the vehicle unit when the vehicle unit is in the vicinity of mobile unit 14. This may be accomplished utilizing the communication algorithm disclosed in the Tripathi et al. '774 patent application publication.

Figure 3:
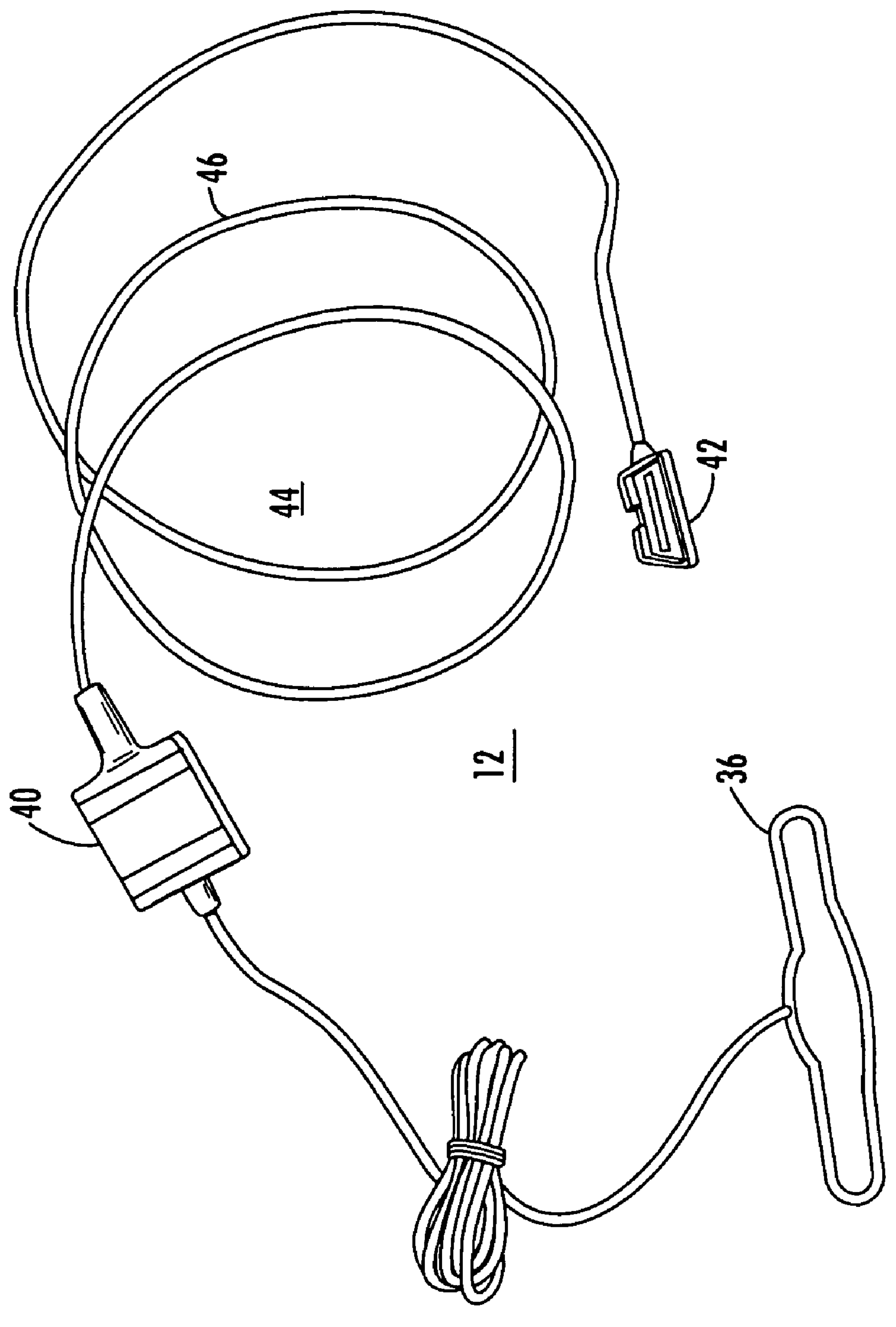
FIG. 3 is a perspective view of a vehicle unit useful with the invention.

Vehicle unit 12 further includes a microprocessor-based control 40 and an OBD connector 42 (FIG. 3). Control 40 and connector 42 define an OBD interface 44 between the vehicle diagnostic system and transceiver 36. Interface 44 further includes a cable 46 that connects connector 42 with electronic control unit 40. Control 40 includes both OBD and radio frequency communication circuitry and connects to external antenna 36 that may be affixed to an inside part of the vehicle's windshield, or the like. The vehicle's OBD DCL connector provides power to vehicle unit 12. In the illustrative embodiment, each vehicle unit has a unique address ID which uniquely identifies the unit and the vehicle when transmitting vehicle data. This may include transmitting of a unique vehicle number with the vehicle data. The unique vehicle number may be a vehicle VIN number or unique numbers associated with major vehicle assemblies.

Wireless communication link 34, in the illustrative embodiment, utilizes a single-chip radio transceiver in the 2.4-2.5 GHz band. An encrypted ASCII binary protocol may be utilized for data security. In the illustrative embodiment, the communication range of wireless communication link 34 with a vehicle traveling at approximately 50 miles per hour with respect to mobile unit 14 may be up to approximately 300 feet. Control 40 may update readings from the OBD diagnostic port at a regular interval, such as every two minutes, and storing the latest valid reading in memory. Alternatively, control 40 may cause vehicle data to be stored in memory only upon the occurrence of a specific event. A specific event may be the generation of a particular diagnostic code by the vehicle diagnostic system. The diagnostic code may be generated upon a parameter of the vehicle being out of specification. Likewise, the particular event may be one or more other parameters of the vehicle, such as vehicle throttle position, vehicle speed, and the like. Other examples of particular events will be apparent to the skilled artisan.

Mobile unit 14 includes a data storage unit 48 and support hardware and software for storing vehicle data from multiple vehicle units 12. Mobile unit 14 may further include a network wireless transceiver for wireless network communications with database system 26 and/or with a relay unit 22. Mobile unit 14 may further include a receiver 52 for a satellite-positioning system, such as a global positioning system (GPS), in order to identify the location of mobile unit 14. Data storage unit 48 is a programmed computer unit having data organization and storage capability. It may also provide overall control for the various subsystems of mobile unit 14.

Figure 2:
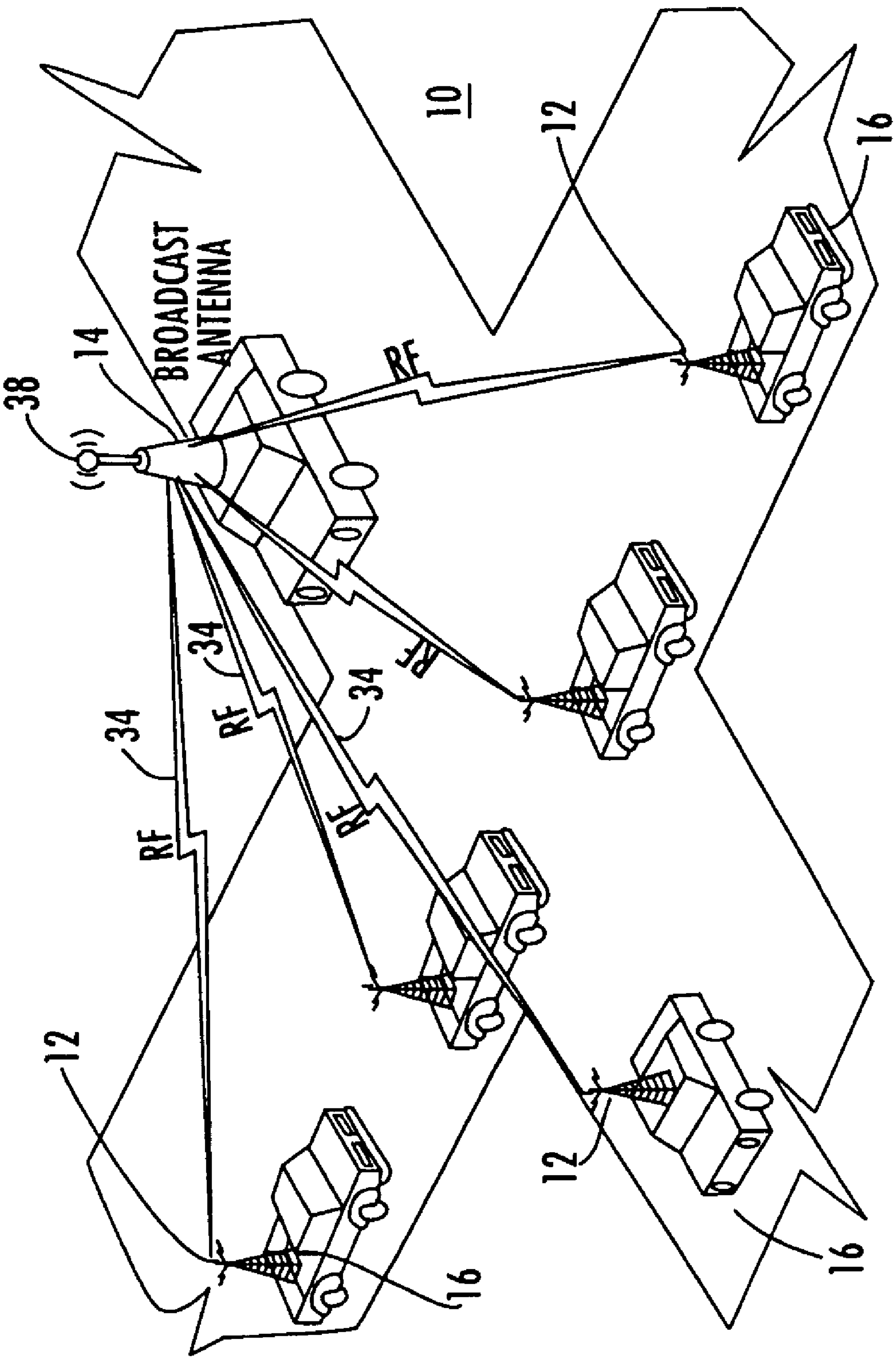
FIG. 2 is a block diagram illustrating operation of a mobile geographically dispersed wireless communication transceiver.

Operation of vehicle inspection system 10 may be better understood by reference to FIG. 2. As mobile unit 14 is transported by transport mechanism 18, which is illustrated as a road vehicle, transceiver 38 activates the vehicle unit 12 of each vehicle 16 in the vicinity of mobile unit 14 that receives a signal from mobile unit 14 over a wireless communication link 34. In turn, a vehicle unit 12 in the vicinity of mobile unit 14 transmits data in its memory over wireless communication link 34. Because transport mechanism 18 is transporting transceiver 38, it provides the ability to collect vehicle data from vehicles that may not otherwise come into contact with a generally stationary geographically distributed wireless communication transceiver, such as one adjacent to a roadway traveled by vehicles. It is known that drivers tend to travel generally in a given pattern on the same roads. Therefore, if the drivers' normal traveling habits do not bring it within the vicinity of a wireless communication transceiver adjacent to a roadway traveled by the vehicle, the vehicle data may not be transmitted to communication system 20. Because mobile unit 14 may travel in a more or less random pattern, it is more likely that any given vehicle unit 12 will come within the vicinity of mobile unit 14 and thereby transfer vehicle data to the communication system. Moreover, mobile unit 14 does not require a dedicated communication connection, such as a network connection utilized in the Tripathi et al. '774 patent application publication. All that is required is to provide electrical energy to the mobile unit.

Mobile unit 14 collects vehicle data from vehicle units 12 utilizing a wireless communication link without reoccurring communication charges between vehicle unit 12 and mobile unit 14. Mobile unit 14 may communicate the accumulated vehicle data with database system 26, such as by utilizing a wireless link 32 provided that the mobile unit 14 is within transmission range of the database system. One or more relay units 22 may be utilized to transfer the vehicle data from mobile unit 14 to network 24. Relay unit 22 may be a generally stationary geographically dispersed wireless communication transceiver that is located adjacent to a roadway traveled by vehicles, as disclosed in the Tripathi et al. '774 patent application publication. Alternatively, relay unit 22 may be located at the depot of buses, commercial trucks, or the like, that are transporting mobile unit 14, such that vehicle data is transferred to network 24 when the vehicle returns to its depot. It individual personal automobiles are used to transport mobile data collection unit 14, the relay unit could be a data modem connected with the personal computer of the automobile's owner. Other combinations for transferring vehicle data from mobile unit 14 to database system 26, either directly or via network 24, will be apparent to the skilled artisan.

Database system 26 may be made available to regulatory agencies 54, such as environmental protection agencies, the Department of Motor Vehicles, police departments, and the like, in order to perform regulatory functions, such as vehicle environmental regulatory compliance verification, also known as "emission inspections." Access may be provided to database system 26 by the motorists 56 in order to monitor vehicle performance data and/or obtain diagnostic data on the vehicle. Also, access may be provided to network 24 by a commercial establishment 58, such as a bank, or the like, in order to facilitate transfer of credit to an EZ-pass system or otherwise carry out routine bank transactions from vehicle 16. Access to database 26 may be provided to various governmental systems 60, such as the Department of Motor Vehicles, various police agencies, and the like, in order to carry out other regulatory and police functions.

Vehicle inspection system 10 is especially useful for low density populations. Low density populations may be insufficient to support permanently installed geographically dispersed wireless communication transceivers located adjacent to roadways traveled by vehicles. Thus, mobile unit 14 may travel to a small town or even a rural area from time to time in order to collect vehicle data in that area. A motorist may be able to monitor the location of vehicle 18 bearing mobile unit 14, such as over an Internet connection. This may be made possible by providing the mobile unit with a GPS receiver 52, which can be displayed over the Internet. This may allow the motorist, who is in need of obtaining an emission inspection, or the like, to travel to the mobile unit in order to have its vehicle data transferred to communication system 20. Also, data may be collected from a vehicle even when parked, such as at home or at work. A small power supply, such as a battery or capacitor, may keep the vehicle unit 12 powered in a sleep mode even when the ignition is off. Upon being poled by mobile wireless communication transceiver 14, the vehicle unit can wake up to transmit vehicle data. A feedback mechanism may be provided for communication system 20 to establish, or modify, a route to be taken by the vehicle transporting mobile unit 14. This may allow data to be collected from vehicles that have not yet transmitted data.

Thus, it is seen that the present invention provides a truly flexible and efficient technique for transferring vehicle data to a database system for regulatory compliance, such as vehicle environmental regulatory compliance verification as accessed by a regulatory agency or for vehicle performance monitoring or vehicle diagnosis as accessed by the motorist or a monitoring facility. The flexibility is achieved by allowing the vehicle having the vehicle unit to come into the vicinity of a geographically dispersed wireless communication transceiver by the motion of the vehicle, the motion of the geographically dispersed wireless communication transceiver, or both. Moreover, by combination with a more permanently installed geographically dispersed wireless communication transceiver located adjacent to a roadway, an optimal system may be achieved that maximizes communication bandwidth while minimizing cost. Moreover, recurrent communication charges can be kept to a minimum. They may be eliminated altogether between the vehicle unit and the geographically dispersed wireless communication transceivers and at least reduced between the geographically dispersed wireless communication transceivers and the central database system.

The present invention requires minimal installed system cost and, therefore, reduces cost of use. For example, the communication system can be established without the usual permits and fees associated with installed systems and in large part without recurrent communication charges associated with using an existing installed communication system.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A vehicle communication system, comprising:

a plurality of vehicles, each having a vehicle diagnostic system;

a plurality of vehicle units each positioned in one of said vehicles, each of said vehicle units comprising an interface that is configured to connect with the vehicle diagnostic system, a vehicle wireless communication transceiver and a control for controlling said wireless communication transceiver, said control including memory for storing data, wherein said control retrieves vehicle data from the vehicle diagnostic system and stores the vehicle data in said memory;

another vehicle;

a communication system for two-way wireless communication with said vehicle units, said communication system made up of a mobile unit positioned in said another vehicle, said mobile unit comprising a data storage unit and a mobile wireless communication transceiver, wherein said mobile wireless communication transceiver activates said vehicle wireless communication transceiver of one of said vehicle units to communicate vehicle data in said memory to said mobile wireless communication transceiver in response to said mobile wireless communication transceiver being transported by said another vehicle to a vicinity of said one of said vehicle units in order to increase geographic coverage for data transfer from the vehicle diagnostic systems of said vehicles.

2. The system as claimed in claim 1 wherein said another vehicle comprises at least one chosen from a commercial vehicle, a private vehicle and a public vehicle.

3. The system as claimed in claim 1 wherein said communication system comprises a communication network, wherein said communication network includes a host computer and at least one relay unit, said relay unit adapted to transferring vehicle data from said mobile wireless communication transceiver to said host computer.

4. The system as claimed in claim 1 including at least one stationary wireless communication transceiver that is located adjacent to a roadway traveled by at least some of said vehicles, wherein said at least one stationary wireless communication transceiver activates said vehicle wireless communication transceiver of one of said vehicle units so that said vehicle wireless communication transceiver communicates data in said memory to said at least one substantially stationary wireless communication transceiver in response to said one of said vehicle units being transported by the one of said vehicles in which it is positioned to a vicinity of that stationary wireless communication transceiver.

5. The system as claimed in claim 1 wherein said communication system comprises a communication network and a host computer on said network, said host computer operative to receive from said mobile unit data storage unit sent by said mobile wireless communication transceiver over said communication network and including a database for storing data from said vehicle unit.

6. The system as claimed in claim 1 wherein regulatory authority is provided access to data for vehicle environmental regulatory compliance verification.

7. The system as claimed in claim 1 wherein a vehicle owner is provided access to retrieved data for at least one chosen from vehicle malfunction diagnosis and vehicle performance monitoring.

8. The system as claimed in claim 1 wherein said control stores data from a vehicle diagnostic system in said memory in response to occurrence of a particular event.

9. The system as claimed in claim 8 wherein said particular event is at least one selected from generation of a diagnostic code, vehicle throttle position and vehicle speed.

10. The system as claimed in claim 1 wherein said communication system tracks the geographic location of said mobile unit.

11. The system as claimed in claim 10 wherein a route traveled by said mobile unit is determined at least in part by which particular vehicle units have sent data to said at least one mobile wireless communication transceiver.

12. A method of collecting data from a plurality of vehicles, comprising:

providing a plurality of vehicles, each having a vehicle diagnostic system;

providing a plurality of vehicle units and positioning each of said vehicle units in one of said vehicles, each of said vehicle units comprising an interface that is configured to connect with the vehicle diagnostic system, a vehicle wireless communication transceiver and a memory;

retrieving data from the vehicle diagnostic system of each of the vehicles using the vehicle unit installed in that vehicle and storing the retrieved data in said memory;

providing another vehicle;

providing a communication system for two-way communication with said vehicle unit, said communication system made up of a mobile unit comprising a data storage unit and a mobile wireless communication transceiver; positioning said mobile wireless communication transceiver in another vehicle;

activating the vehicle wireless communication transceiver of one of said vehicle units with said mobile wireless communication transceiver thereby communicating vehicle data in said memory to said at least one mobile wireless communication transceiver in response to said mobile wireless communication transceiver being transported by said another vehicle to a vicinity of said vehicle unit in order to increase geographic coverage for data transfer from the diagnostic systems of said vehicles.

13. The method as claimed in claim 12 wherein said another vehicle comprises at least one chosen from a commercial vehicle, a private vehicle and a public vehicle.

14. The method as claimed in claim 12 wherein said communication system comprises a communication network, wherein said communication network includes a host computer and at least one relay unit, and further including transferring data with said at least one relay unit from said mobile unit storage data unit with said mobile wireless communication transceivers to said host computer.

15. The method as claimed in claim 12 including providing at least one stationary wireless communication transceiver that is located adjacent to a roadway traveled by at least some of said vehicles and activating said vehicle wireless communication transceiver of one of said vehicle units with said at least one stationary wireless communication transceiver in response to the one of said vehicles in which that vehicle unit is positioned transporting that vehicle unit within a vicinity of said at least one stationary wireless communication transceiver, wherein said vehicle wireless communication transceiver communicates data in said memory to said at least one stationary wireless communication transceiver.

16. The method as claimed in claim 12 wherein said communication system comprises a communication network and a host computer on said network, said host computer including a database for storing data from said vehicle unit, said method further including said transferring data with said mobile wireless communication transceiver from said storage unit of said mobile unit to said database using said communication network.

17. The method as claimed in claim 12 including providing access to data retrieved from a vehicle unit by a regulatory authority for vehicle environmental regulatory compliance verification.

18. The method as claimed in claim 12 including providing access to data retrieved from each of said vehicle units by a vehicle owner for at least one chosen from vehicle performance monitoring and vehicle malfunction diagnosis.

19. The method as claimed in claim 12 wherein said storing data in said memory from a vehicle onboard diagnostic system is in response to occurrence of a particular event.

20. The method as claimed in claim 19 wherein said particular event is at least one selected from generation of a diagnostic code, vehicle throttle position and vehicle speed.

21. The method as claimed in claim 12 including tracking the geographic location of said at least one of said another vehicle.

22. The method as claimed in claim 21 including establishing a route traveled by said another vehicle at least in part in response to which of said vehicle units have communicated data to said at least one mobile communication transceiver.

* * * * *

UNITED STATES PATENT AND TRADEMARK OFFICE
CERTIFICATE OF CORRECTION

PATENT NO. : 7,596,435 B1
APPLICATION NO. : 11/462118
DATED : September 29, 2009
INVENTOR(S) : Pradeep R. Tripathi and Bruce R. Kohn It is certified that error appears in the above-identified patent and that said Letters Patent is hereby corrected as shown below:

Column 7:
Line 25, Claim 5, Insert --data-- after “receive”.

Signed and Sealed this

Twenty-seventh Day of April, 2010

David J. Kappos
*Director of the United States Patent and Trademark Office*

UNITED STATES PATENT AND TRADEMARK OFFICE

CERTIFICATE OF CORRECTION

PATENT NO. : 7,596,435 B1
APPLICATION NO. : 11/462118
DATED : September 29, 2009
INVENTOR(S) : Pradeep R. Tripathi It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 435 days.

Signed and Sealed this

Twentieth Day of July, 2010

David J. Kappos

*Director of the United States Patent and Trademark Office*